(12) United States Patent
Luik (10) Patent No.: US 11,440,101 B2
(45) Date of Patent: Sep. 13, 2022

(54) TOOL FOR MACHINING A WORKPIECE

(71) Applicant: Hartmetall-Werkzeugfabrik Paul Horn GmbH, Tuebingen (DE)

(72) Inventor: Matthias Luik, Reutlingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 266 days.

(21) Appl. No.: 16/864,497

(22) Filed: May 1, 2020

(65) Prior Publication Data

US 2020/0254528 A1 Aug. 13, 2020

Related U.S. Application Data

(63) Continuation of application No. PCT/EP2019/057213, filed on Mar. 22, 2019.

(30) Foreign Application Priority Data

Apr. 30, 2018 (DE) ...................... 10 2018 110 397.2

(51) Int. Cl.
*B23B 27/10* (2006.01)
*B23B 27/16* (2006.01)
(Continued)

(52) U.S. Cl.
CPC .............. *B23B 27/10* (2013.01); *B23B 27/16* (2013.01); *B23B 5/28* (2013.01); *B23B 51/06* (2013.01)

(58) Field of Classification Search
CPC ......... B23B 29/12; B23B 27/10; B23B 27/16; B23B 27/1614; B23B 51/06;
(Continued)

(56) References Cited

U.S. PATENT DOCUMENTS 2,575,239 A * 11/1951 Stephens ........... B23B 51/00035
175/401
3,466,721 A * 9/1969 Binns .................. B23B 27/1666
407/70
(Continued)

FOREIGN PATENT DOCUMENTS

DE 3004166 A * 8/1980 ............. B23B 27/10
DE 3033626 A1 4/1982
(Continued)

OTHER PUBLICATIONS

International Search Report for International Application No. PCT/EP2019/057213, dated Jun. 5, 2019.
(Continued)

*Primary Examiner* — Sara Addisu
(74) *Attorney, Agent, or Firm* — Jason H. Vick; Sheridan Ross, PC (57) ABSTRACT

Tool for machining a workpiece, comprising: a holder having a first internal coolant duct; a cutting insert having a main cutting edge; a first fastening element for releasably fastening the cutting insert to the holder; a plate-like coolant guiding attachment having a second internal coolant duct; and a second fastening element for releasably fastening the coolant guiding attachment to the holder. In the assembled state of the tool, the first internal coolant duct is fluidically connected to the second internal coolant duct and the coolant guiding attachment covers at least a part of the cutting insert. The coolant guiding attachment comprises a first opening, which is configured as a recess or through-opening and allows access to the first fastening element, such that the cutting insert is separately releasable from the holder by releasing the first fastening element even when the coolant guiding attachment is fastened to the holder, and the coolant guiding attachment is separately releasable from the holder
(Continued)

by releasing the second fastening element even when the cutting insert is fastened to the holder.

14 Claims, 9 Drawing Sheets

(51) Int. Cl.
  *B23B 51/06* (2006.01)
  *B23B 5/28* (2006.01)
(58) Field of Classification Search
  CPC . B23B 2231/24; B23B 2250/12; B23Q 11/10; B23C 5/28
  See application file for complete search history.

(56) References Cited

U.S. PATENT DOCUMENTS

| | | | | |
|---|---|---|---|---|
| 4,535,216 A * | 8/1985 | Cassidenti | ............. | B23B 27/10 82/51 |
| 4,621,547 A * | 11/1986 | Yankoff | ............. | B23B 27/167 407/11 |
| 4,848,198 A * | 7/1989 | Royal | ............. | B23B 27/10 407/11 |
| 5,237,894 A * | 8/1993 | Lindeke | ............. | B23Q 11/1084 82/900 |
| 5,718,156 A * | 2/1998 | Lagrolet | ............. | B23B 27/10 407/11 |
| 5,901,623 A * | 5/1999 | Hong | ............. | B23Q 11/1053 407/100 |
| 6,447,218 B1 * | 9/2002 | Lagerberg | ............. | B23B 27/10 407/115 |
| 6,652,200 B2 * | 11/2003 | Kraemer | ............. | B23B 27/10 407/104 |
| 8,465,232 B2 | 6/2013 | Amstibovitsky et al. | | |
| 8,734,062 B2 * | 5/2014 | Henry | ............. | B23B 27/10 407/11 |
| 8,827,599 B2 * | 9/2014 | Henry | ............. | B23B 27/10 407/114 |
| 10,946,452 B2 * | 3/2021 | Thuresson | ............. | B23C 5/28 |
| 2002/0114674 A1 * | 8/2002 | Hansson | ............. | B23B 27/1662 407/103 |
| 2003/0082018 A1 * | 5/2003 | Kraemer | ............. | B23Q 11/10 407/100 |
| 2004/0240949 A1 * | 12/2004 | Pachao-Morbitzer | ............. | B23B 27/065 407/115 |
| 2006/0263153 A1 * | 11/2006 | Isaksson | ............. | B23B 27/065 407/113 |
| 2007/0257544 A1 * | 11/2007 | Baker | ............. | B23B 27/10 299/81.2 |
| 2010/0196105 A1 | 8/2010 | Amstibovitsky et al. | | |
| 2011/0305531 A1 * | 12/2011 | Amstibovitsky | ............. | B23B 27/10 407/11 |
| 2011/0311323 A1 * | 12/2011 | Hecht | ............. | B23B 27/10 407/107 |
| 2013/0220089 A1 * | 8/2013 | Amstibovitsky | ............. | B23B 27/10 407/11 |
| 2014/0270999 A1 | 9/2014 | Huang | | |
| 2016/0175938 A1 * | 6/2016 | Kaufmann | ............. | B33Y 10/00 407/11 |
| 2017/0320141 A1 * | 11/2017 | Musil | ............. | B23Q 11/1061 |
| 2018/0369923 A1 * | 12/2018 | Chen | ............. | B23B 27/16 |
| 2019/0001454 A1 * | 1/2019 | Huang | ............. | B23Q 11/1023 |
| 2019/0030613 A1 * | 1/2019 | Larsson | ............. | B23B 27/1662 |
| 2019/0217397 A1 * | 7/2019 | Kaufmann | ............. | B23B 27/10 |
| 2019/0308250 A1 * | 10/2019 | Larsson | ............. | B22F 10/20 |
| 2020/0030885 A1 * | 1/2020 | Mun | ............. | B23Q 11/10 |
| 2020/0038962 A1 * | 2/2020 | Kobayashi | ............. | B23B 27/10 |
| 2020/0361001 A1 * | 11/2020 | Hecht | ............. | B23B 27/04 |
| 2021/0260668 A1 * | 8/2021 | Henger | ............. | B23B 27/10 |
| 2022/0063001 A1 * | 3/2022 | Burkle | ............. | B23B 27/16 |

FOREIGN PATENT DOCUMENTS

| | | | | |
|---|---|---|---|---|
| DE | 10331077 B3 | 2/2005 | | |
| DE | 112011102930 T5 | 7/2013 | | |
| DE | 102016221518 A1 | 3/2018 | | |
| EP | 100376 A * | 2/1984 | ............. | B23B 27/10 |
| EP | 1495821 A1 | 1/2005 | | |
| EP | 1522382 A1 | 4/2005 | | |
| JP | 07185991 A * | 7/1995 | ............. | B23B 27/10 |
| JP | H 08-25109 A | 1/1996 | | |
| JP | 10094904 A * | 4/1998 | | |
| JP | H 10-94904 A | 4/1998 | | |
| JP | 2002346810 A * | 12/2002 | | |
| RU | 2507035 C2 | 2/2014 | | |
| RU | 2575530 C2 | 2/2016 | | |
| SU | 1816651 A1 | 5/1993 | | |
| WO | WO 93/05913 | 4/1993 | | |
| WO | WO 2010/095124 | 8/2010 | | |
| WO | WO 2012/030484 | 3/2012 | | |
| WO | WO-2016121663 A1 * | 8/2016 | ............. | B23B 27/04 |
| WO | WO-2018143089 A1 * | 8/2018 | ............. | B23B 27/10 |

OTHER PUBLICATIONS

Written Opinion for International Application No. PCT/EP2019/057213, dated Jun. 5, 2019.
International Preliminary Report on Patentability for International Application No. PCT/EP2019/057213, dated Nov. 12, 2020.
Decision to Grant a Patent for Invention (Including Translation) for corresponding Russian Application No. 2020114185/05(023745), dated Aug. 26, 2020.
Intention to Grant for corresponding European Patent Application No. 19713010.7, dated Jul. 21, 2020.

* cited by examiner

TOOL FOR MACHINING A WORKPIECE

CROSS REFERENCE TO RELATED APPLICATIONS

This application is a continuation of international patent application PCT/EP2019/057213, filed on Mar. 22, 2019 designating the U.S., which international patent application has been published in German language and claims priority from German patent application DE 10 2018 110 397.2, filed on Apr. 30, 2018. The entire contents of these priority applications are incorporated herein by reference.

BACKGROUND OF THE INVENTION

This disclosure relates to a tool for machining a workpiece, wherein the tool comprises a holder having a first internal coolant duct, a cutting insert, and a first fastening element for releasably fastening the cutting insert to the holder.

In tools with an interchangeable cutting insert and an internal coolant duct, the internal coolant duct serves to guide coolant and/or lubricant (referred to as coolant in the following text for convenience) inside the tool holder and to conduct it into the region or at least into the vicinity of the cutting insert. Frequently, a central coolant duct, through which the coolant is conducted in the holder interior, is provided for this purpose in the longitudinal direction in the holder.

The coolant serves substantially to cool and lubricate the cutting insert while it is being used. In addition to reducing cutting-insert wear, the coolant also helps to improve chip formation and thus increases the quality of the surface finish on the workpiece to be machined.

In order to be able to ensure a good mode of action, it is necessary for the coolant jet to be oriented as exactly as possible onto the lip region of the cutting insert, in order to as closely as possible reach the points of the cutting insert that are in contact with the workpiece to be machined.

A frequent problem in tools with internal cooling is the manner in which the coolant duct is fitted within the tool holder. For the abovementioned reasons, in particular the arrangement of the coolant outlet opening at which the coolant leaves the internal coolant duct is important.

In the case of the tool known from DE 103 31 077 B3, the coolant outlet opening is arranged on a tower-like structure of the holder, which is located behind and above the cutting insert. In this way, the coolant is directed in the direction of the main cutting edge of the cutting insert obliquely from above from the rear side thereof. Nevertheless, in that case, the coolant outlet opening is arranged relatively far away from the main cutting edge of the cutting insert. This tends to be a disadvantage given the abovementioned requirements.

A further tool, in which the coolant outlet opening is arranged similarly far away from the main cutting edge of the cutting insert, is known from EP 1 522 382 A1. Here too, the coolant jet is directed onto the rake face of the cutting insert obliquely from above from a point behind the cutting insert.

In the case of the tool known from WO 2010/095124 A1, cooling comparatively close to the lip is achieved by the use of a tubular nozzle which is axially movable in order for it to be possible to position the coolant outlet as desired. However, such a tubular nozzle is not desired for many reasons. Firstly, it can easily break. Moreover, in order to mount the nozzle, a relatively tall structure on the holder is necessary, this being a disadvantage in particular in confined installation situations in machine tools.

In the case of the tool known from DE 11 2011 102 930 T5, the coolant is guided through a central opening provided in the cutting insert and leaves the internal coolant duct at the top side of the cutting insert between the cutting insert and a clamping attachment. Although cooling very close to the lip can be achieved in this way, the construction shown in DE 11 2011 102 930 T5 is relatively complicated. On account of the clamping attachment, it is relatively laborious to change the cutting insert, since the entire structure together with the clamping attachment has to be released from the holder in order to separate the cutting insert from the holder and to be able to exchange it.

SUMMARY OF THE INVENTION

It is an object to provide a tool having an internal coolant guide, in which the abovementioned problems are remedied. In this case, it is in particular an object to provide cooling as close to the lip as possible and at the same time to allow easy changing of the cutting insert.

According to a first aspect, a tool is provided which comprises a holder having a first internal coolant duct, a cutting insert, a first fastening element for releasably fastening the cutting insert to the holder, a substantially plate-like coolant guiding attachment having a second internal coolant duct and a second fastening element for releasably fastening the coolant guiding attachment to the holder. In the assembled state of the tool, the first internal coolant duct is fluidically connected to the second internal coolant duct and the coolant guiding attachment covers at least a part of the cutting insert. The coolant guiding attachment comprises a first opening, which is configured as a recess or through-opening and allows access to the first fastening element, such that the cutting insert is separately releasable from the holder by releasing the first fastening element even when the coolant guiding attachment is fastened to the holder, and the coolant guiding attachment is separately releasable from the holder by releasing the second fastening element even when the cutting insert is fastened to the holder, wherein the second internal coolant duct comprises a first coolant outlet opening and a second coolant outlet opening at which coolant leaves the second internal coolant duct, wherein the first and the second coolant outlet opening are arranged on a front side, facing the main cutting edge, of the coolant guiding attachment on opposite sides of the first opening, wherein the first coolant outlet opening is arranged at a first distance from an imaginary reference plane which is oriented perpendicularly to the longitudinal axis of the holder and in which a central axis of the second fastening element is located, the second coolant outlet opening is arranged at a second distance from the imaginary reference plane, a central axis of the first fastening element is arranged at a third distance from the imaginary reference plane, and at least one point on the main cutting edge is arranged at a fourth distance from the imaginary reference plane, and wherein the following applies: third distance≤second distance≤first distance<fourth distance.

The herein presented tool has the advantage that, on account of the coolant guiding attachment, which is preferably mounted above the cutting insert and at least partially covers the cutting insert, cooling very close to the lip is possible. The coolant guiding attachment is mounted on the holder above the cutting insert and is placed on the cutting insert as a kind of separate plate. The coolant guiding attachment comprises at least two coolant outlet openings, referred to as first and second coolant outlet openings in the present case, at which the coolant emerges from the second internal coolant duct. On account of the arrangement above the cutting insert and its plate-like configuration, this coolant outlet opening can be positioned very close to the lip region or very close to the main cutting edge of the cutting insert. A compact structure of the tool is nevertheless ensured.

Since the two coolant outlet openings are arranged on opposite sides of the first opening, which allows access to the first fastening element, it is possible to supply the main cutting edge with coolant along the majority of its length or even along its entire length—in spite of the first opening in the coolant guiding attachment being located as it were in the way.

The abovementioned distance relationships between the first, second, third and fourth distance mean, in other words, that the main cutting edge is arranged at a greater distance from the second fastening element, with which the coolant guiding attachment is fastened to the holder, compared with the first fastening element, with which the cutting insert is fastened to the holder, and compared with the two coolant outlet openings. In addition, the two coolant outlet openings are arranged at least at the same height as the central axis of the first fastening element or are even spaced further apart from the second fastening element or the imaginary reference plane than the central axis of the first fastening element. This in turn means conversely that the two coolant outlet openings are arranged closer to the main cutting edge than the first fastening element, or are arranged at least equally as close to the main cutting edge as the first fastening element. The coolant guiding attachment thus at least partially surrounds the first opening or even projects laterally forwards beyond the central axis of the first fastening element in the direction of the main cutting edge. This produces cooling very close to the lip and results in optimum cooling properties of the main cutting edge and thus also in as little wear to the main cutting edge as possible.

Furthermore, the abovementioned distance relationships mean that the cutting insert is fastened comparatively closer to the main cutting edge of the cutting insert than the coolant guiding attachment is fastened. Therefore, the second fastening element, by means of which the coolant guiding attachment is fastened, does not have to be guided through the cutting insert. This additionally makes the separate disassemblability of the cutting insert and coolant guiding attachment easier.

The imaginary reference plane is a plane that is used here only as a reference plane to describe the spatial arrangement but is not physically present. This imaginary reference plane is defined by the central axis of the second fastening element and an axis oriented perpendicularly to the longitudinal axis of the holder. It thus intersects the second reference element centrally along its central axis and is oriented perpendicularly to the longitudinal axis of the holder.

A further advantage of the herein presented tool is that the coolant guiding attachment is fastened to the holder separately from the cutting insert. The term "separately" does not mean in a separate location here. Rather, what is meant is that the two elements (the cutting insert and the coolant guiding attachment) are connected to the holder separately from one another, in each case individually by separate fastening elements, preferably directly, such that both the cutting insert and the coolant guiding attachment can be mounted on and removed from the holder independently of one another.

Thus, for example, the cutting insert, which usually represents the main wearing part of the tool, can be released from the holder and replaced with a new cutting insert without the coolant guiding attachment having to be removed from the holder for this purpose. On account of the first opening, configured as a recess or through-opening, in the coolant guiding attachment, access to the first fastening element, with which the cutting insert is fastened to the holder, is available at any time.

When a screw is used as the first fastening element, the tool engagement means of this screw is then readily accessible to a tool key when the coolant guiding attachment covers a majority of the cutting insert. Since the coolant guiding attachment and the cutting insert are not fastened jointly to the holder, it is also conversely possible for the coolant guiding attachment to be released from the holder without this requiring removal of the cutting insert.

In this type of construction, the shape of the coolant guiding attachment can otherwise be adapted optimally to the conditions, that is to say for example to the shape of the cutting insert and/or the desired coolant purpose.

According to a refinement, the first distance is equal to the second distance. Accordingly, the two coolant outlet openings are at the same distance from the central axis of the second fastening element or imaginary plane. Conversely, the two coolant outlet openings are preferably also at the same distance from the main cutting edge as a result. This is particularly advantageous when the main cutting edge is a straight cutting edge that is oriented perpendicularly to the longitudinal direction of the holder. In this case, the following preferably applies: third distance<second distance=first distance<fourth distance.

However, if the main cutting edge is a cutting edge that is at an angle or at least partially curved with a comparatively complex geometry, the first and the second distance can also be selected to be different from one another, such that one coolant outlet opening is arranged further forward than the other. The condition that the first and second distance are equal to or greater than the third distance also applies for this alternative configuration, however. In this case, the following would thus apply: third distance<second distance<first distance<fourth distance.

According to a refinement, the second internal coolant duct comprises a coolant inlet opening, at which the coolant enters the second internal coolant duct, wherein the coolant inlet opening is arranged at a fifth distance from the imaginary plane, which is less than the third distance.

Therefore, the coolant flows within the coolant guiding attachment from the rear to the front. This is advantageous in particular from a fluid dynamic point of view since the coolant is not excessively deflected and scarcely loses speed.

The coolant inlet opening is preferably arranged on an underside of the coolant guiding attachment, said underside facing an outer side of the holder in the assembled state of the tool. The first and the second coolant outlet opening are arranged preferably on a front side of the coolant guiding attachment, said front side facing the main cutting edge of the cutting insert in the mounted state of the tool and extending transversely to the underside. The term "transversely" is not necessarily understood to mean perpendicularly in the present case, but rather any non-parallel orientation.

Although the present document refers to only one coolant inlet opening, it goes without saying that the coolant guiding attachment can also have a plurality of separate coolant inlet openings. However, it is advantageous for the coolant guiding attachment to have only a single coolant inlet opening, since this simplifies the coolant transfer between the first internal coolant duct located in the holder and the second internal coolant duct located in the coolant guiding attachment. Since the two coolant ducts (first internal coolant duct and second internal coolant duct) are fluidically connected together in the mounted state of the tool, they then form a common, cohesive coolant duct.

The fact that the coolant duct is a common, cohesive coolant duct does not imply, however, that this cohesive coolant duct does not have a plurality of branches. Preferably, the second internal coolant duct located in the coolant guiding attachment branches into a plurality of duct parts that lead into different coolant outlet openings at which the coolant emerges from the coolant guiding attachment.

According to a further refinement, the second internal coolant duct extends inside the coolant guiding element around at least a part of the first opening.

This first opening, which is configured as a recess or through-opening, serves, as already mentioned, as access for a tool key to the first fastening element, with the aid of which the cutting insert is fastened releasably to the holder. The second internal coolant duct extends at least partially past this opening, without colliding therewith.

Preferably, the first opening is bounded in the circumferential direction by an inner wall, wherein a part of this inner wall that is located closest to the imaginary reference plane (E) compared with the other parts of the inner wall is arranged at a sixth distance from the imaginary reference plane, which is less than the third distance.

Therefore, in the mounted state of the tool, the first and second coolant outlet openings arranged on the coolant guiding attachment are preferably arranged closer to the main cutting edge of the cutting insert than at least one part of the inner wall of the first opening. This also contributes positively to the abovementioned advantage of cooling as close as possible to the lip, wherein at the same time it is possible to exchange the cutting insert easily without it being necessary to release the coolant guiding attachment from the holder for this purpose.

According to a further refinement, the second internal coolant duct has at least one curved portion. This curved portion serves to guide the coolant past the first opening.

Preferably, this portion is curved in an arcuate manner. Compared with an angular configuration of the second internal coolant duct, an arcuate curve has fluid dynamic advantages since the coolant then does not experience any "hard" deflections with increased flow resistance in the interior of the coolant guiding attachment.

Such a curved coolant guiding duct can be produced most easily by additive manufacturing of the coolant guiding attachment. Additive manufacturing, which is frequently also referred to as generative manufacturing, is the collective term for all manufacturing methods that lead to rapid and cost-effective manufacturing of parts and take place on the basis of computerized data models (for example CAD data models) from amorphous or shape-neutral material by means of chemical and/or physical processes. Examples of such additive manufacturing methods are 3D printing, stereolithography, selective laser melting, selective laser sintering, etc.

Conventionally, i.e. by producing internal bores in the coolant guiding attachment, such curved duct portions are scarcely producible. Therefore, the production of the coolant guiding attachment with the aid of additive manufacturing makes it possible to produce a coolant duct with a shape of optimum design in terms of fluid dynamics. Moreover, the second internal coolant duct can thus be made to bypass the first opening relatively easily. Furthermore, this brings about considerable cost advantages in the production of the coolant guiding attachment.

The second internal coolant duct preferably comprises a first duct part, which opens out into the first coolant outlet opening, and a second duct part, which opens out into the second coolant outlet opening, wherein both the first and the second duct part are fluidically connected to the coolant inlet opening. The two duct parts thus preferably branch off from one another within the coolant guiding attachment and extend on different sides of the first opening.

Rather than only two coolant outlet openings, it is also possible for more coolant outlet openings to be provided on the coolant guiding attachment, which are arranged on different sides of the first opening.

According to a further refinement, the first opening arranged on the coolant guiding attachment is configured as a slot.

The configuration as a slot affords the advantage that the coolant guiding attachment can be arranged in different positions with respect to the holder without access to the first fastening element, with the aid of which the cutting insert is fastened to the holder, being lost.

Preferably, the slot comprises a central axis that extends parallel to the longitudinal axis of the holder. In this way, the coolant guiding attachment can then be moved transversely to the main cutting edge of the cutting insert in order to set the distance of the at least one coolant outlet opening arranged on the coolant guiding attachment from the main cutting edge of the cutting insert as desired.

In this refinement, preference is likewise given to the fact that the second fastening element, with the aid of which the coolant guiding attachment is fastened to the holder, is likewise fastened to the holder by way of a slot located in the coolant guiding attachment. The central axis of this second slot extends preferably parallel to the central axis of the first opening configured as a slot.

According to a further refinement, the tool, in addition to the first fastening element, comprises a third fastening element for fastening the cutting insert to the holder, wherein the coolant guiding attachment comprises a second opening, which is configured as a recess or through-opening and allows access to the third fastening element.

This refinement is advantageous in particular when relatively wide cutting inserts are used, which are fastened with the aid of two fastening elements. In this case, too, the coolant guiding attachment ensures access for a tool key to both fastening elements (first and third fastening element) with which the cutting insert is fastened to the holder. Thus, in this refinement too, the cutting insert can be released from the holder separately from the coolant guiding attachment. Said second opening can likewise be configured as a slot, resulting in the abovementioned advantages.

In a further development of the last-mentioned refinement, the second internal coolant duct comprises a first duct part, which opens out into the first coolant outlet opening, a second duct part, which opens out into a second coolant outlet opening, and a third duct part, which opens out into a third coolant outlet opening, wherein the first opening is arranged between the first and the second duct part, and wherein the second opening is arranged between the second and the third duct part.

The second internal coolant duct therefore comprises, according to this development, a plurality of duct parts that extend on different sides of the openings arranged in the coolant guiding attachment. In spite of there being a plurality of fastening elements, it is thus likewise possible, according to this development, to guide coolant at different points along the main cutting edge of the cutting insert.

For fastening the cutting insert, preferably a first fastening opening is provided within the cutting insert. For fastening the coolant guiding attachment, preferably a second fastening opening is provided in the coolant guiding attachment. The first fastening element is inserted into the holder through the first fastening opening in the assembled state of the tool. In the assembled state of the tool, the second fastening element is inserted into the holder through the second fastening opening.

Preferably, the first fastening element is configured as a first screw and the second fastening element is configured as a second screw. Accordingly, the holder preferably comprises a first internal thread for screwing in the first screw and a second internal thread for screwing in the second screw.

As already mentioned, instead of one fastening element, or one screw, it is also possible for a plurality of fastening elements, or a plurality of screws, to be used to fasten the cutting insert. Likewise, instead of one fastening element, or one screw, it is also possible for a plurality of fastening elements, or a plurality of screws, to be used to fasten the coolant guiding attachment.

It goes without saying that the features mentioned above and those yet to be explained below are usable not only in the combination given in each case but also in other combinations or on their own, without departing from the spirit and scope of the present disclosure.

DESCRIPTION OF PREFERRED EMBODIMENTS

The tool is identified overall in the drawings by the reference numeral 10.

The tool 10 comprises a tool holder 12 to which a cutting insert 14 and a coolant guiding attachment 16 are releasably fastened. The tool holder 12 is referred to as holder 12 in the following text for convenience.

In the present exemplary embodiment, the holder 12 comprises a substantially bar-like, elongate main body, at the front end of which a cutting insert receptacle 18 for receiving the cutting insert 14 is arranged. Arranged in the region of the opposite rear end of the holder 12 is a coolant/lubricant port 20. Usually, the bar-like main body of the holder 12 is clamped in place in a machine tool. The coolant/lubricant port 20 is connected to a coolant/lubricant supply in order to pass coolant through the interior of the holder 12 into the region of the cutting insert 14.

The cutting insert 14 and the coolant guiding attachment 16 are releasably fastened to the holder 12 separately from one another. For fastening the cutting insert 14, a first fastening element 22 is used, which is configured as a screw in the present exemplary embodiment. For fastening the coolant guiding attachment 16, a second fastening element 24 is used, which is likewise configured as a screw in the present exemplary embodiment. In the assembled state of the tool 10, the two screws 22, 24 are inserted into the holder 12. The holder 12 comprises a first internal thread 26 for screwing in the first screw 22 and a second internal thread 28 for screwing in the second screw 24. The first screw 22 is screwed into the first internal thread 26 through a first fastening opening 27 arranged in the cutting insert 14. The second screw 24 is screwed into the second internal thread 28 through a second fastening opening 29 arranged in the coolant guiding attachment 16.

In the assembled state of the tool 10, the coolant guiding attachment 16 is arranged above the cutting insert 14, wherein the coolant guiding attachment 16 covers at least a part of the cutting insert 14. In principle, the coolant guiding attachment 16 can be placed directly on the cutting insert 14 such that the underside of the coolant guiding attachment 16 comes into contact with the top side of the cutting insert 14. However, it is advantageous for there to be a small air gap between the underside of the coolant guiding attachment and the top side of the cutting insert 14, such that the coolant guiding attachment 16 is not in direct contact with the cutting insert 14. This allows easier exchangeability of the cutting insert 14, which, after the first fastening element 22 is released, can be pulled out easily from beneath the cooling guiding attachment 16. This would of course likewise be possible in the event of contact between the cutting insert 14 and coolant guiding attachment 16. The coolant guiding attachment 16 should, however, not press on the cutting insert 14 with excessive force in this case.

Figure 1:
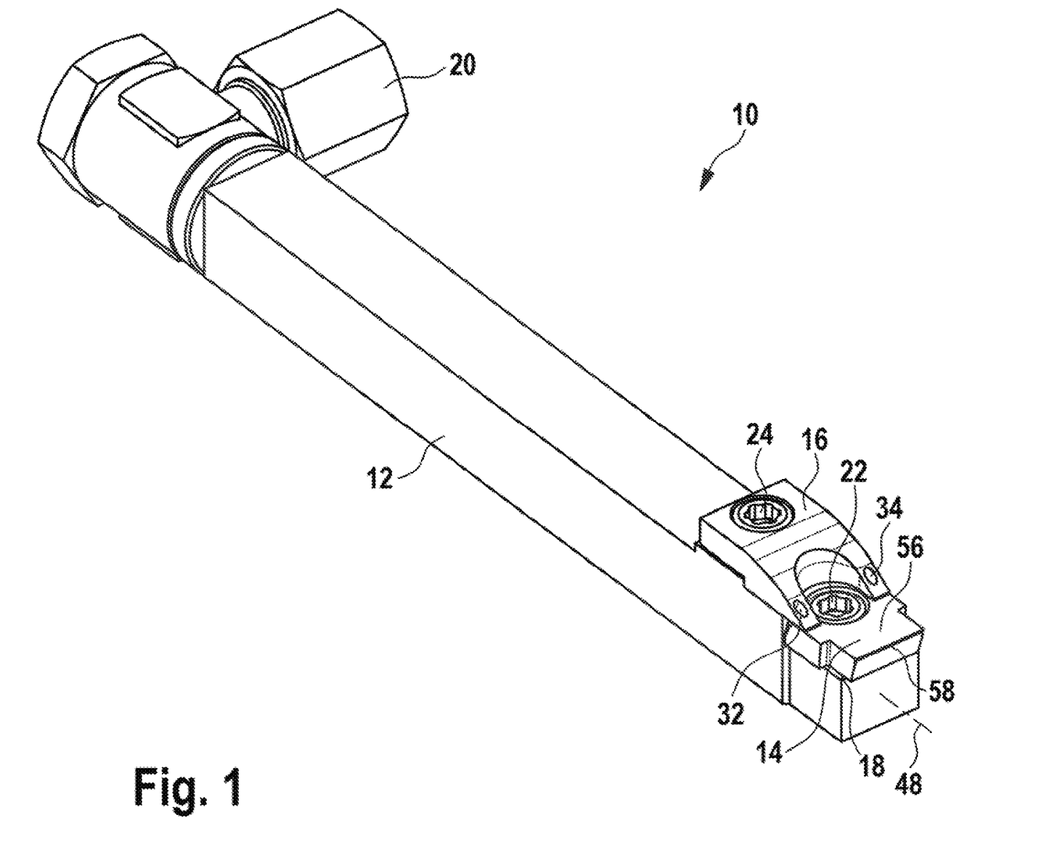
FIG. 1 shows a perspective view of a first exemplary embodiment of the tool.

In the region of its front end, the coolant guiding attachment 16 comprises an opening 30, which is referred to as first opening 30 in the present case. This first opening 30 is configured as a recess in the first exemplary embodiment shown in FIGS. 1 and 2. The first opening 30 serves as access to the first fastening element 22, with the aid of which the cutting insert 14 is fastened to the holder 12. To be more precise, the first opening 30 allows access to the first fastening element 22 for a tool key, in order for it to be possible to release the first fastening element 22 and thus also the cutting insert 14 from the holder 12 even when the coolant guiding attachment 16 is mounted. The cutting insert 14 is thus separately releasable from the holder 12 by releasing the first fastening element 22 even when the coolant guiding attachment 16 is fastened to the holder 12. Conversely, the coolant guiding attachment 16 is separately releasable from the holder 12 by releasing the second fastening element 24 even when the cutting insert 14 is fastened to the holder 12.

The coolant that is introduced into the tool 10 via the coolant port 20 passes through the interior of the holder 12 into the coolant guiding attachment 16 and, in the exemplary embodiment shown here, ultimately emerges from the coolant guiding attachment 16 at two coolant outlet openings 32, 34. In order to distinguish them better, the coolant outlet openings 32, 34 are referred to in the present case as first coolant outlet opening 32 and second coolant outlet opening 34. Of course, it is also conceivable to provide more than two coolant outlet openings at the coolant guiding attachment 16.

Figure 3:
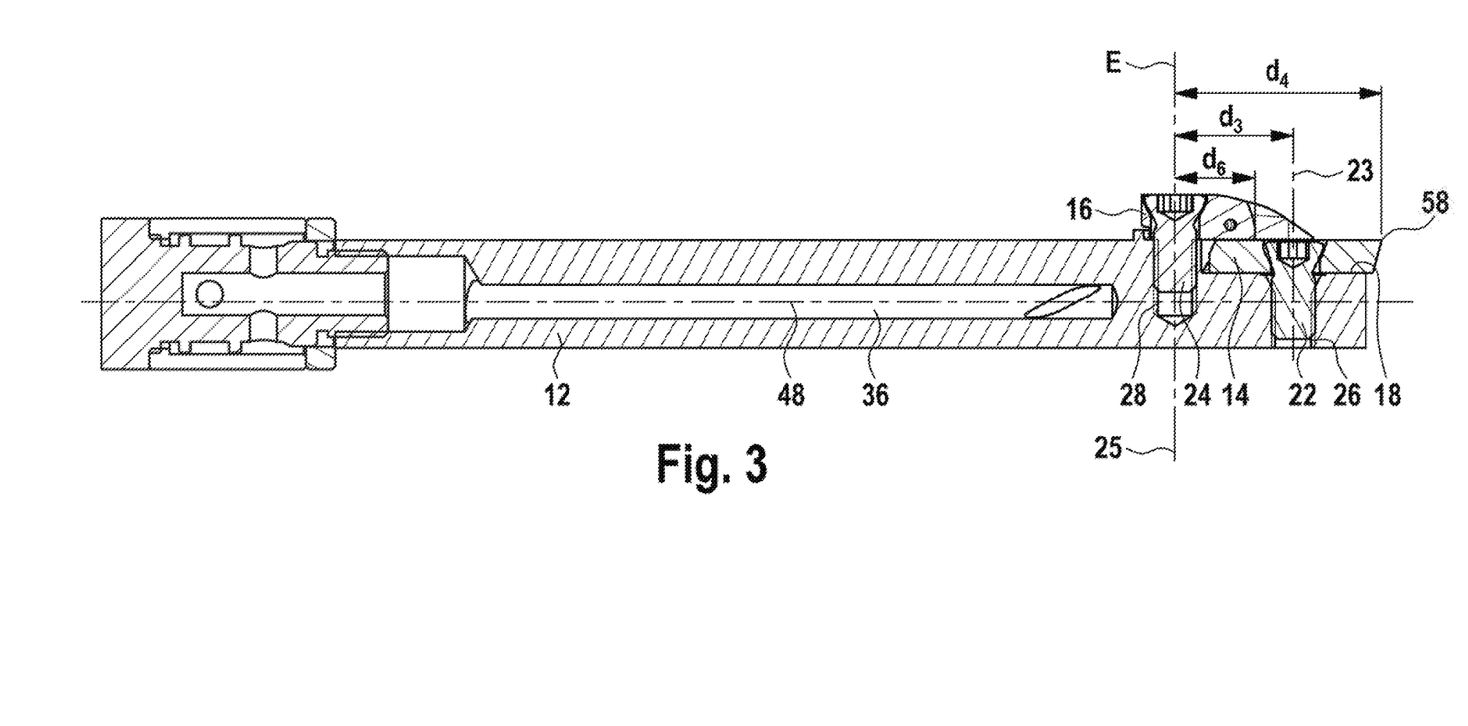
FIG. 3 shows a first view in longitudinal section of the tool shown in FIG. 1.
Figures 4, 5:
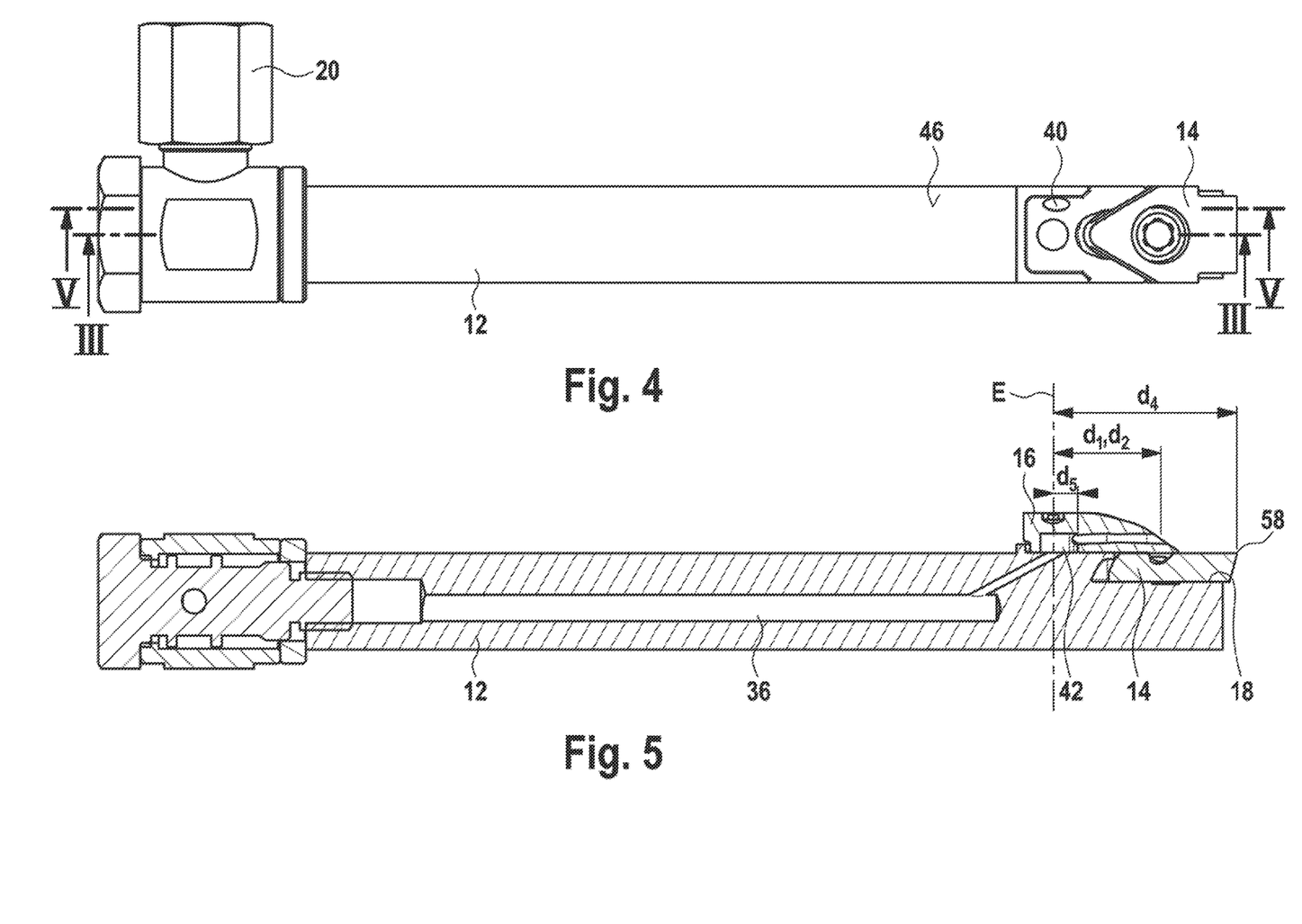
FIG. 4 shows a plan view from above of the tool shown in FIG. 1 without a coolant guiding attachment.
FIG. 5 shows a second view in longitudinal section of the tool shown in FIG. 1.

For guiding coolant within the tool 10, a first internal coolant duct 36 is arranged in the interior of the holder 12 (see FIGS. 3 and 5). In the assembled state of the tool 10, this first internal coolant duct opens out into a second internal coolant duct 38, which is located in the interior of the coolant guiding attachment 16 (see FIGS. 6 and 7). In order to make it easier to understand the drawings, it should be noted that the views in longitudinal section that are shown in FIGS. 3 and 5 differ from one another in that FIG. 3 shows a centrally arranged longitudinal section and FIG. 5 shows an eccentrically arranged longitudinal section. The two sections are indicated in FIG. 4, wherein the coolant guiding attachment 16 is not illustrated in FIG. 4.

Figure 2:
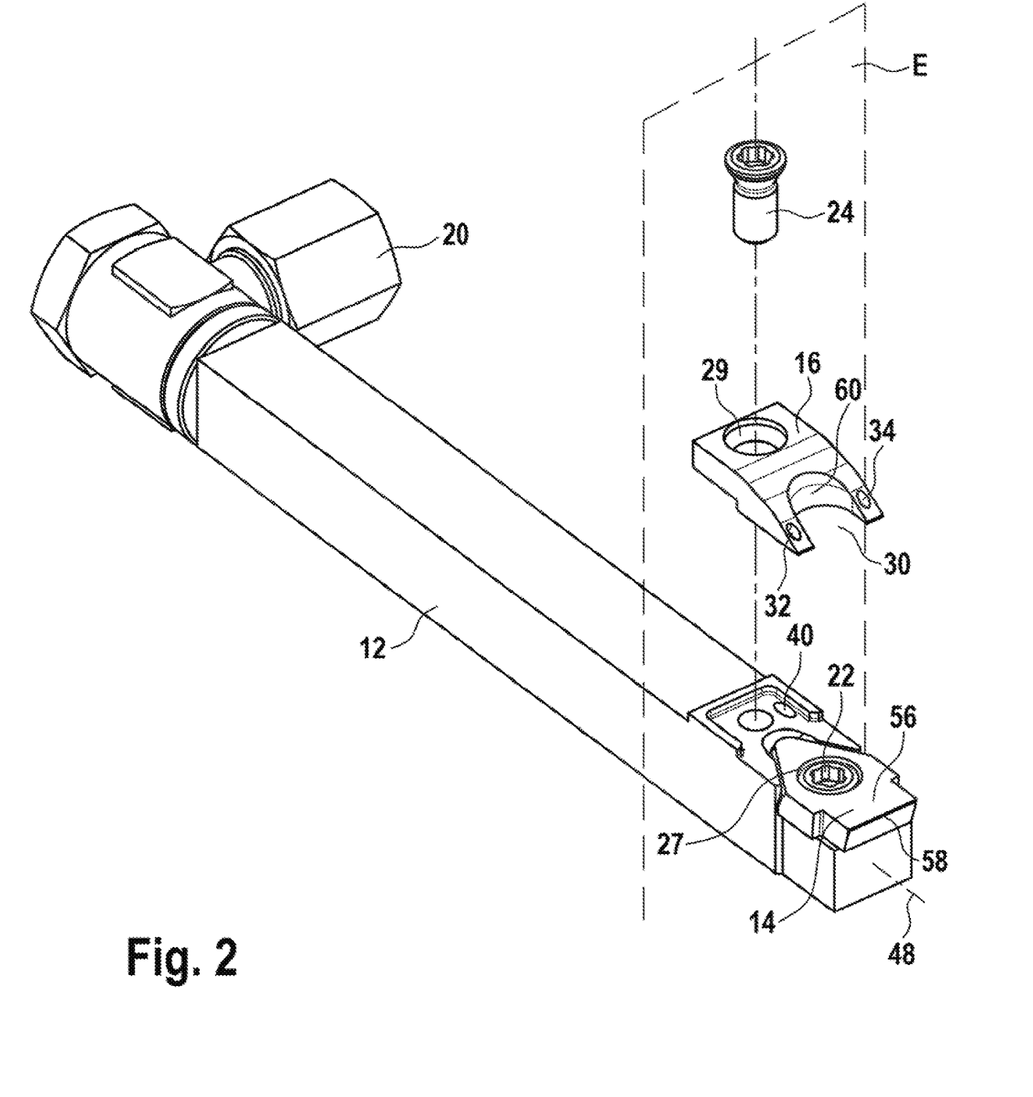
FIG. 2 shows an exploded illustration of the tool shown in FIG. 1.

The first internal coolant duct 36 arranged in the interior of the holder 12 ends at the coolant outlet opening 40, which is arranged on an outer side 46 of the holder 12 (see FIGS. 2 and 4). At this point, in the assembled state of the tool 10, the coolant passes from the first internal coolant duct 36 into the second coolant duct 38. The second internal coolant duct 38 arranged in the interior of the coolant guiding attachment 16 comprises a coolant inlet opening 42, which is arranged on an underside 44 of the coolant guiding attachment 16, said underside 44 facing the outer side 46 of the holder 12 in the assembled state of the tool 10 (see FIGS. 6 and 7). With regard to the longitudinal axis 48 of the tool 10, the coolant 10 flows within the coolant guiding attachment 16, that is to say so to speak from the back to the front. The outer side 46 is preferably, as shown here, the top side of the holder 12. This does not necessarily have to be the case, however, since, depending on the installation situation of the cutting insert 14, the coolant outlet opening 40 can also be arranged in principle on another side of the holder 12. Otherwise, the present wording "facing the outer side 46 of the holder 12" does not preclude a further element, for example a washer, from also being arranged between the holder 12 and the coolant guiding attachment 16 at this point.

In the first exemplary embodiment shown in FIGS. 1-7, the second internal coolant duct 38 comprises two duct parts 50, 52 that branch off from one another. The first duct part 50 opens out into the first coolant outlet opening 32. The second duct part 52 opens out into the second coolant outlet opening 34. Accordingly, the two coolant outlet openings 32, 34 are fluidically connected to the coolant inlet opening 42. The front side 54 of the coolant guiding attachment 16, on which the coolant outlet openings 32, 34 are arranged, extends transversely to the underside 44, on which the coolant inlet opening 42 is arranged.

Figure 6:
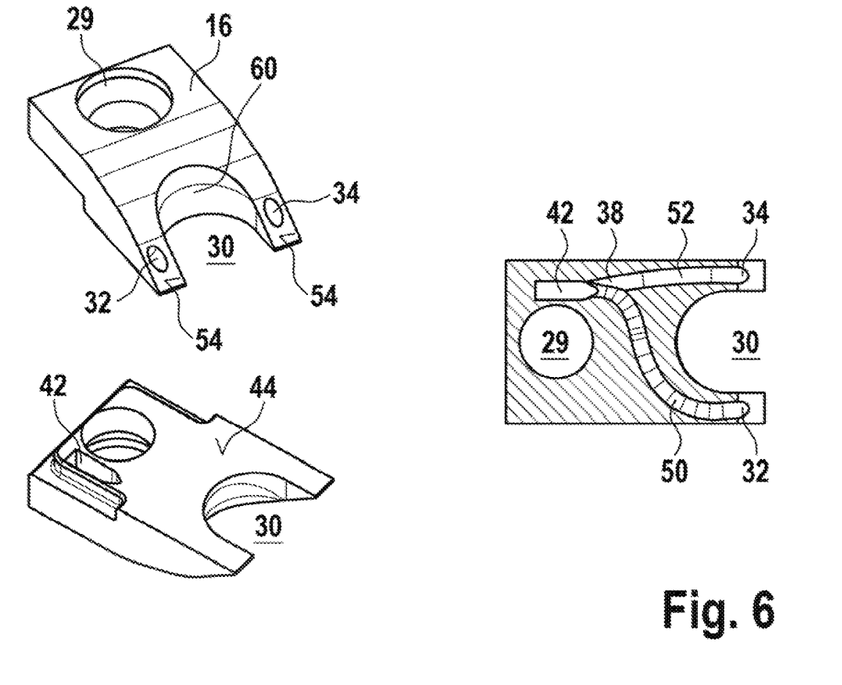
FIG. 6 shows a plurality of views of the coolant guiding attachment according to one exemplary embodiment.
Figure 7:
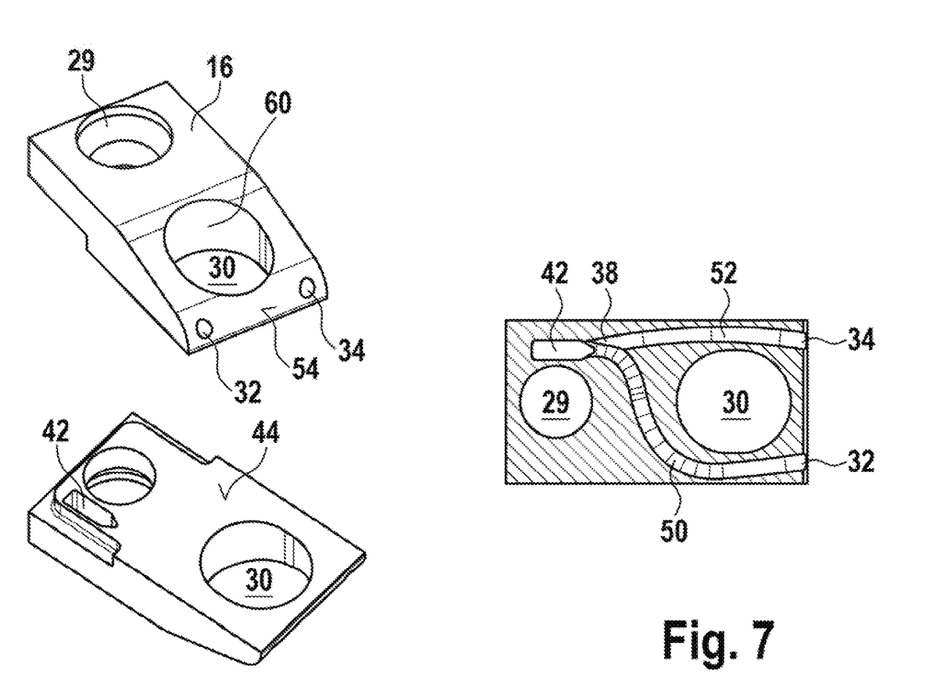
FIG. 7 shows a plurality of views of the coolant guiding attachment according to a further exemplary embodiment.
Figure 8:
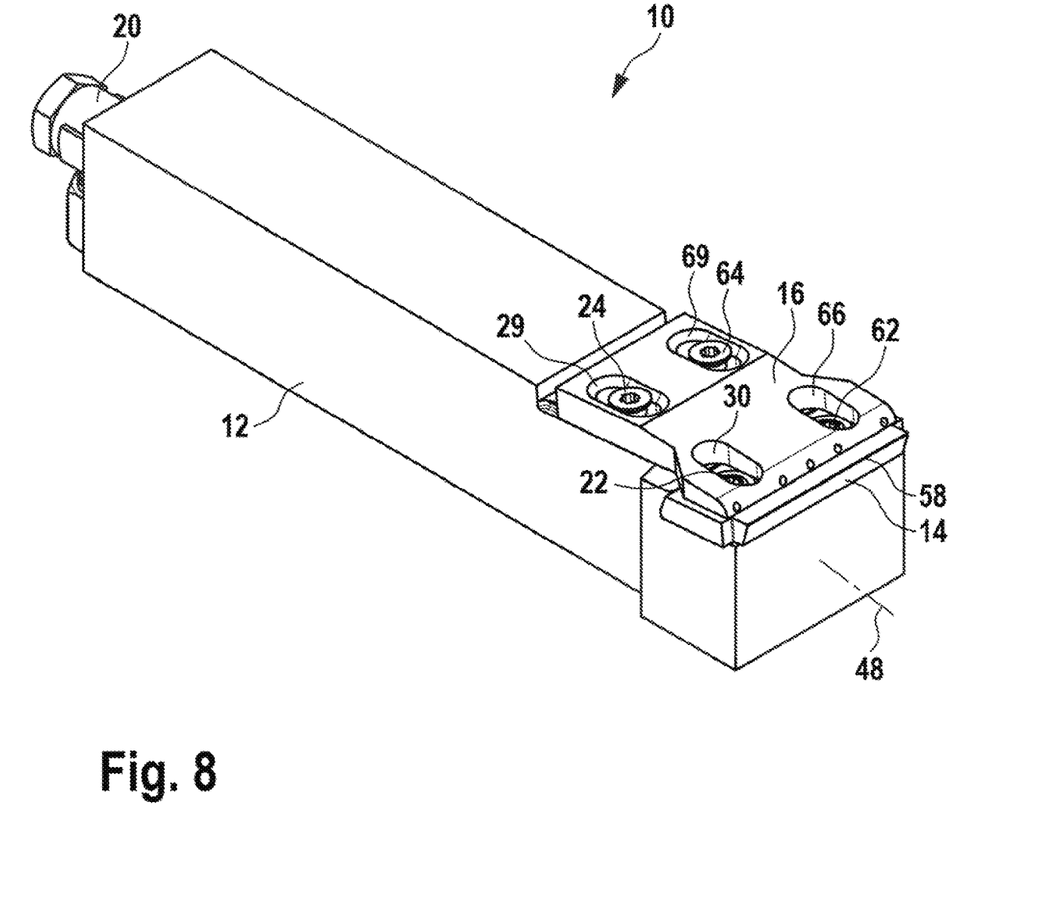
FIG. 8 shows a perspective view of a second exemplary embodiment of the tool.
Figure 9:
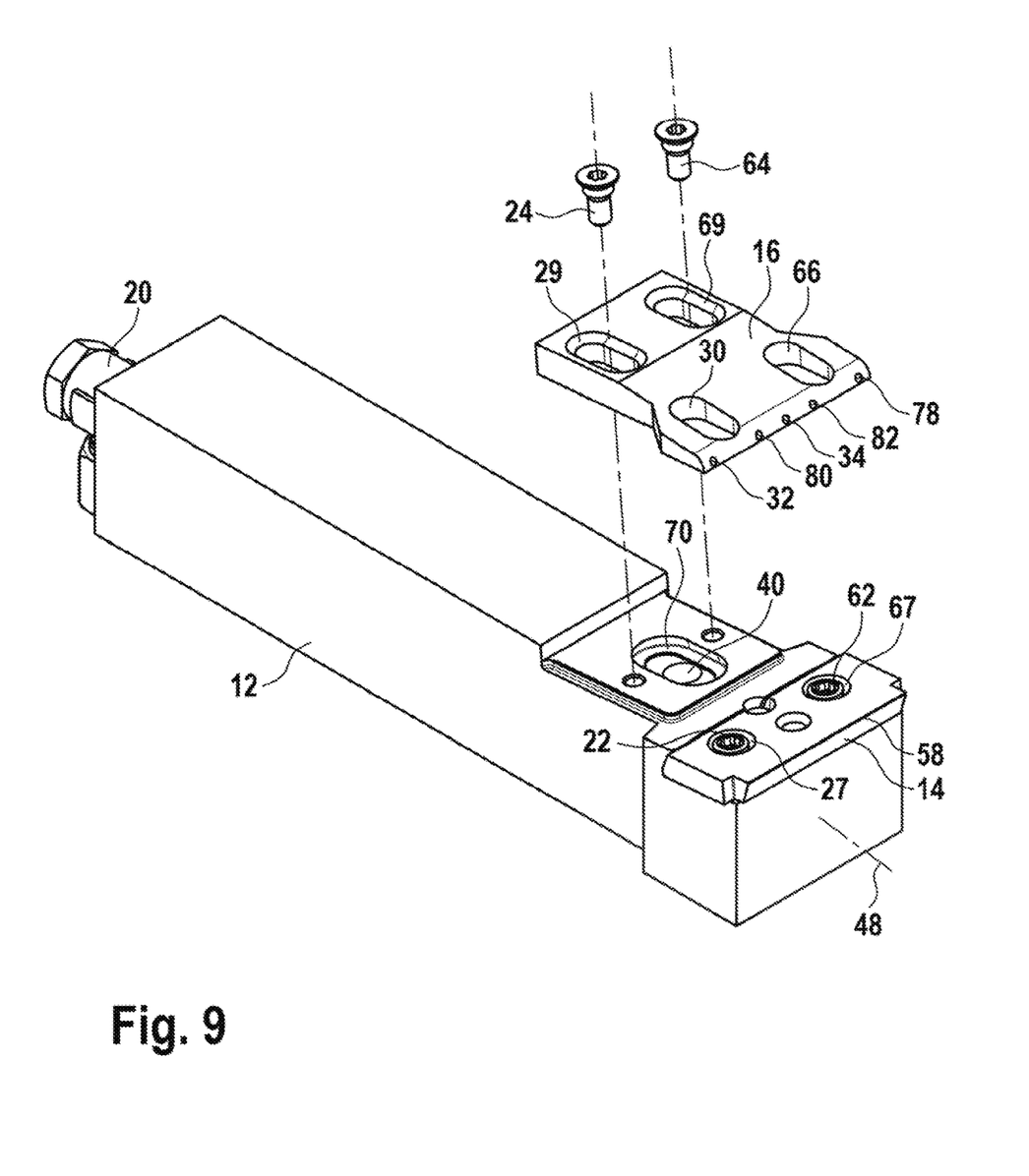
FIG. 9 shows an exploded illustration of the tool shown in FIG. 8.
Figure 10:
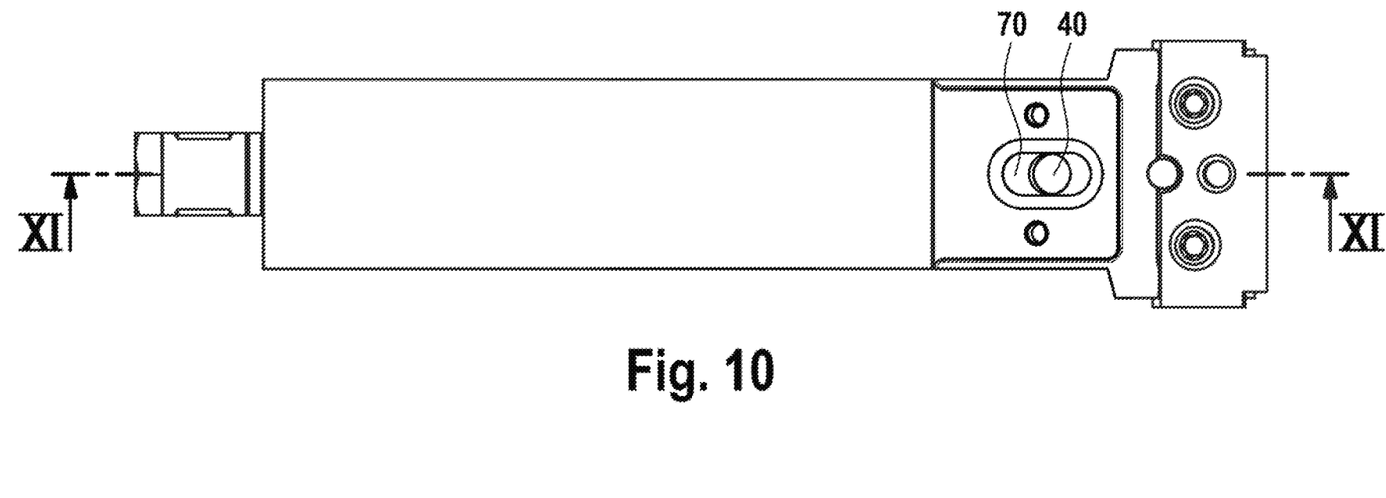
FIG. 10 shows a plan view from above of the tool shown in FIG. 8 without a coolant guiding attachment.
Figure 11:
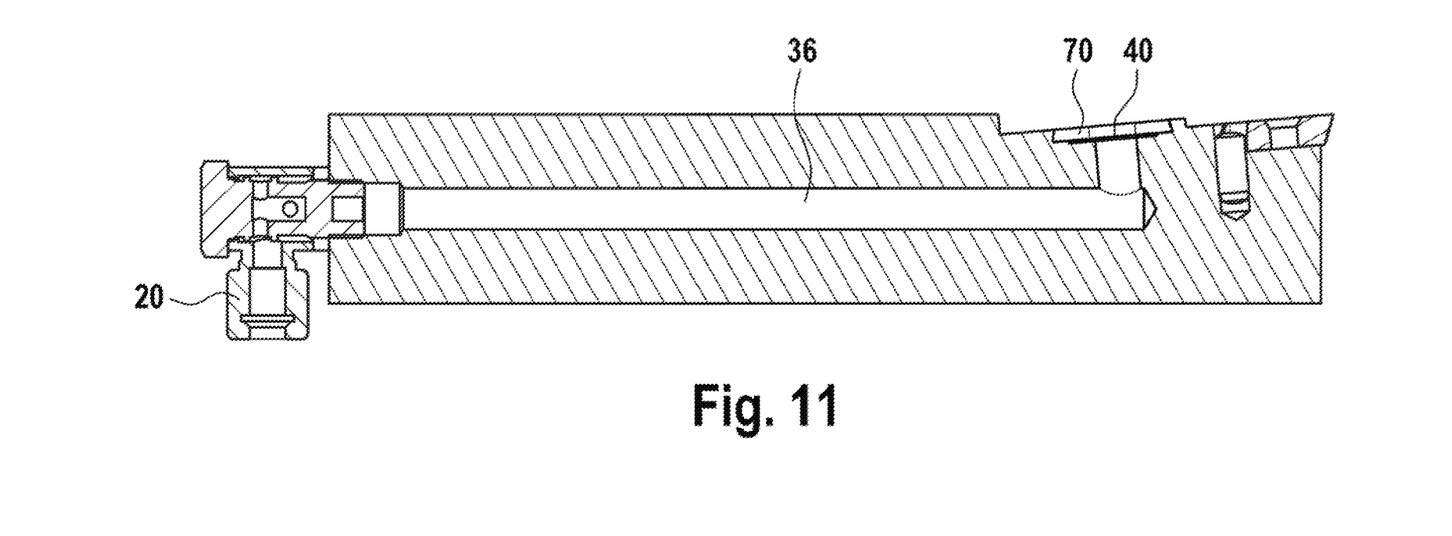
FIG. 11 shows a view in longitudinal section of the tool shown in FIG. 10 without a coolant guiding attachment.

As is furthermore apparent from FIGS. 6 and 7, the two duct parts 50, 52 are arcuately curved, i.e. non-angular ducts that extend at least partially around the first opening 30. As a result of the curvature thereof, it is possible—unlike with angular coolant ducts—to direct the coolant past the first opening 30 optimally in terms of fluid dynamics and guide it as far as the coolant outlet openings 32, 34. Thus, it is also possible to arrange the two coolant outlet openings 32, 34 on opposite sides of the first opening 30 and nevertheless to fluidically connect the coolant outlet openings 32, 34 in the interior of the coolant guiding attachment 16 to one and the same coolant inlet opening 42.

Such duct parts 50, 52 can scarcely be produced conventionally, i.e. by subsequent introduction of bores into the coolant guiding attachment 16. Therefore, the coolant guiding attachment 16 is preferably produced by additive manufacturing. The introduction of arcuately curved duct parts does not cause any problems in the additive manufacturing of the coolant guiding attachment 16.

In spite of the access, ensured by the first opening 30, to the first fastening element 22, the abovementioned type of configuration of the second internal coolant duct 38 nevertheless allows cooling of the cutting insert 14 very close to the lip. The coolant outlets 32, 34 can be oriented very exactly onto the rake face 56 and/or the main cutting edge 58 of the cutting insert 14. On account of the arcuate curvature of the coolant ducts 50, 52, the coolant also does not have to pass out of the coolant guiding attachment 16 in a manner parallel to the longitudinal axis 48 of the tool. Depending on the curvature of the duct parts 50, 52, a coolant jet oriented at an angle to the longitudinal axis 48 can also be created. In this way, virtually all parts of the rake face 56 and/or of the main cutting edge 58 can be supplied optimally with coolant. It should be noted that, although the main cutting edge 58 is in the form of a straight cutting edge in the present exemplary embodiment, it can in principle have any possible shape and size.

For the preferred relative arrangement of the abovementioned elements of the tool 10, the following can be noted: the coolant outlet openings 32, 34 are arranged at least at the same height as a central axis 23 of the first fastening element 22. Preferably, the coolant outlet openings 32, 34 are even arranged closer to the main cutting edge 58 than the central axis 23 of the first fastening element 22. With regard to an imaginary reference plane E that is oriented perpendicularly to the longitudinal axis 48 of the holder 12 and divides the second fastening element 24 into two equal halves, the coolant outlet openings 32, 34 are arranged preferably at a distance $d_1$ or $d_2$ from the reference plane E that is equal to or greater than a distance $d_3$ of the central axis 23 of the first fastening element 22 from this reference plane E.

Where distances from or to the coolant outlet openings 32, 34 are mentioned herein, this can relate to any desired point of the coolant outlet openings 32, 34. Preferably, but not necessarily, reference is made to the geometric centre of the coolant outlet openings 32, 34, however.

In the exemplary embodiment shown in the present case, the two coolant outlet openings 32, 34 are arranged at the same height. However, this does not necessarily have to be the case. Depending on the shape of the main cutting edge 58, they can also be arranged at different distances from the main cutting edge 58 and from the reference plane E, respectively, such that the following then applies: $d_1 \neq d_2$.

The following preferably applies: $d_3 \leq d_2 \leq d_1 < d_4$, wherein $d_4$ denotes the distance from the main cutting edge 58 to the imaginary reference plane E.

In FIGS. 3 and 5, the distances $d_5$ and $d_6$ are furthermore also indicated. The distance $d_5$ denotes the distance between the coolant inlet opening 42 and the reference plane E. The distance $d_6$ denotes the distance of a part of the inner wall 60 of the first opening 30 that is located closest to the imaginary reference plane E compared with the other parts of the inner wall 60 from the reference plane E. This distance $d_6$ is preferably greater than the distance $d_5$. However, particularly preferably, the distance $d_6$ is smaller than the distance $d_3$. Accordingly the following distance relationship preferably arises:

$$d_5 < d_6 < d_3 \leq d_2 \leq d_1 < d_4$$

In the exemplary embodiment of the coolant guiding attachment 16 that is illustrated in FIG. 7, the first opening 30 is not configured as a recess but as a through-opening. Compared to the exemplary embodiment shown in FIG. 6, the front end face 54 of the coolant guiding attachment 16 is furthermore shaped somewhat differently. However, the two exemplary embodiments of the coolant guiding attachment 16 can be used similarly in the tool 10 shown in FIGS. 1-5.

FIGS. 8-12 show a second exemplary embodiment of the tool 10. This second exemplary embodiment likewise follows the principle and structure of the first embodiment shown in FIGS. 1-7. Therefore, in the following text, for convenience, only the differences of the two exemplary embodiments will be discussed in detail.

The tool 10 according to the exemplary embodiment shown in FIGS. 8-12 is configured in a comparatively wider manner (not necessarily in absolute dimensions). Accordingly, the cutting insert 14 and the coolant guiding attachment 16 also have a comparatively wider structure. The coolant/lubricant port 20 is likewise configured in a slightly different manner. Mainly, however, the difference consists in the structure of the coolant guiding attachment 16 and in the attachment of the cutting insert 14 and of the coolant guiding attachment 16 to the holder 12.

The cutting insert 14 is, in addition to the first fastening element 22, releasably fastened to the holder 12 with the aid of a third fastening element 62. The coolant guiding attachment 16 is, in addition to the second fastening element 24, releasably fastened to the holder 12 with the aid of a fourth fastening element 64. All four fastening elements 22, 24, 62, 64 are also preferably configured as tensioning screws in this exemplary embodiment.

In addition to the first fastening opening 27, a third fastening opening 67 is arranged in the cutting insert 14, the third fastening element 62 being inserted into the holder 12 through said third fastening opening 67. Arranged on the coolant guiding attachment 16, in addition to the second fastening opening 29, is a fourth fastening opening 69, through which the fourth fastening element 64 is inserted into the holder 12.

Furthermore, the coolant guiding attachment 16 comprises, in addition to the first opening 30, a second opening 66, which allows access to the third fastening element 62. Thus, in this exemplary embodiment too, separate exchanging of the coolant guiding attachment 16 and cutting insert 14 is possible.

The second fastening opening 29, the fourth fastening opening 69, the first opening 30 and the second opening 66 are each configured as slots in this exemplary embodiment. This makes it possible to adjust the coolant guiding attachment 16 parallel to the longitudinal axis 48 of the tool 10. Regardless of the set position of the coolant guiding attachment 16, on account of the openings 30, 66 that are likewise configured as slots, the cutting insert 14 can also be released from the holder 12 even with the coolant guiding attachment 16 mounted.

In order to be able to ensure the coolant supply in any settable positions of the coolant guiding attachment 16, the coolant outlet opening 40 of the first internal coolant duct 36 lead into a slot 70. The coolant inlet opening 42, arranged on the underside 44 of the coolant guiding attachment 16, into the second internal coolant duct 38 is configured in this exemplary embodiment as a blind hole, the circumference of which is adjoined by a plurality of duct parts 50, 52, 72, 74, 76 of the second internal coolant duct 38 (see FIG. 12).

Figure 12:
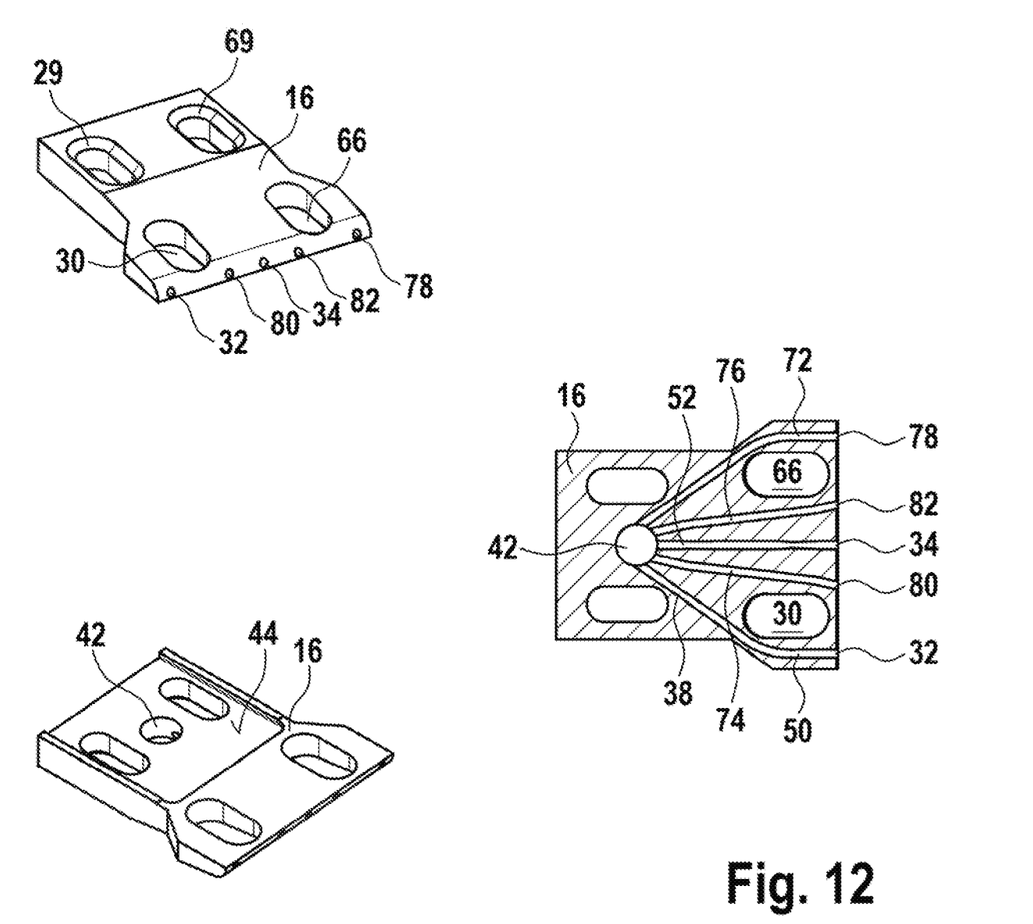
FIG. 12 shows a plurality of views of the coolant guiding attachment according to a third exemplary embodiment.

The two duct parts identified by the reference numerals 50, 52 in FIG. 12 correspond in terms of their arrangement to the duct parts 50, 52, shown in FIGS. 6 and 7, on either side of the first opening 30, and for this reason the nomenclature and reference signs thereof are retained. These two duct parts 50, 52 each lead into the corresponding first and second coolant outlet openings 32, 34. A third duct part 72 opens out into a third coolant outlet opening 78. A fourth duct part 74 opens out into a fourth coolant outlet opening 80. A fifth duct part 76 opens out into a fifth coolant outlet opening 82.

The first duct part 50 and the third duct part 72 are configured as at least partially arcuate duct parts in this exemplary embodiment. The second duct part 34 is not curved in this exemplary embodiment, but configured in a straight manner. The fourth duct part 74 and the fifth duct part 76 are likewise configured in a partially curved manner in this exemplary embodiment, but can in principle also be configured as non-curved, i.e. straight duct parts. Similarly, in this type of structure of the coolant guiding attachment 16, it would be conceivable to omit the fourth duct part 74 and the fifth duct part 76 entirely. Preferably, in this type of structure of the coolant guiding attachment 16, however, at least one duct part is arranged between the two openings 30, 76 and in each case at least one duct part is arranged on the sides of the openings 30, 66 that are located opposite the middle.

A comparison of the two exemplary embodiments, shown herein, of the tool 10, will furthermore reveal various further possible modifications of the structure of the coolant guiding attachment 16 and the fastening thereof to the holder to a person skilled in the art, without departing from the spirit and scope of the present disclosure.

What is claimed is:

1. Tool for machining a workpiece, comprising:
a holder which extends along a longitudinal axis and comprises a first internal coolant duct;
a cutting insert having a main cutting edge;
a first fastening element which is configured to releasably fasten the cutting insert to the holder;
a plate-like coolant guiding attachment having a second internal coolant duct; and
a second fastening element which is configured to releasably fasten the coolant guiding attachment to the holder;
wherein, in an assembled state of the tool, the first internal coolant duct is fluidically connected to the second internal coolant duct and the coolant guiding attachment covers at least a part of the cutting insert,
wherein the coolant guiding attachment comprises a first opening, which is configured as a recess or through-opening and allows access to the first fastening element, such that the cutting insert is separately releasable from the holder by releasing the first fastening element even when the coolant guiding attachment is fastened to the holder, and the coolant guiding attachment is separately releasable from the holder by releasing the second fastening element even when the cutting insert is fastened to the holder,
wherein the second internal coolant duct comprises a first coolant outlet opening and a second coolant outlet opening at which coolant leaves the second internal coolant duct, wherein the first and the second coolant outlet opening are arranged on a front side of the coolant guiding attachment on opposite sides of the first opening, wherein said front side of the coolant guiding attachment faces the main cutting edge, wherein the first coolant outlet opening is arranged at a first distance from an imaginary reference plane which is oriented perpendicularly to the longitudinal axis of the holder and in which a central axis of the second fastening element is located, wherein the second coolant outlet opening is arranged at a second distance from the imaginary reference plane, wherein a central axis of the first fastening element is arranged at a third distance from the imaginary reference plane, and wherein at least one point on the main cutting edge is arranged at a fourth distance from the imaginary reference plane, and wherein the following applies: third distance≤second distance≤first distance<fourth distance.

2. Tool according to claim 1, wherein the first distance is equal to the second distance.

3. Tool according to claim 1, wherein the first distance and the second distance are each greater than the third distance.

4. Tool according to claim 1, wherein the second internal coolant duct comprises a coolant inlet opening, at which the coolant enters the second internal coolant duct, wherein the coolant inlet opening is arranged at a fifth distance from the imaginary plane, which is less than the third distance.

5. Tool according to claim 4, wherein the coolant inlet opening is arranged on an underside of the coolant guiding attachment, said underside facing an outer side of the holder in the assembled state of the tool.

6. Tool according to claim 4, wherein the second internal coolant duct comprises a first duct part, which opens out into the first coolant outlet opening, and a second duct part, which opens out into the second coolant outlet opening, wherein both the first and the second duct part are fluidically connected to the coolant inlet opening.

7. Tool according to claim 1, wherein the second internal coolant duct extends inside the coolant guiding attachment around at least a part of the first opening.

8. Tool according to claim 1, wherein the first opening is bounded in a circumferential direction by an inner wall, wherein a part of this inner wall that is located closest to the imaginary reference plane compared with all remaining parts of the inner wall is arranged at a sixth distance from the imaginary reference plane, which is less than the third distance.

9. Tool according to claim 1, wherein the second internal coolant duct has at least one curved portion.

10. Tool according to claim 1, wherein the first opening comprises a slot.

11. Tool according to claim 1, further comprising a third fastening element which is configured to fasten the cutting insert to the holder, wherein the coolant guiding attachment comprises a second opening, which is configured as a recess or through-opening and allows access to the third fastening element.

12. Tool according to claim 11, wherein the second internal coolant duct comprises a first duct part, which opens out into the first coolant outlet opening, a second duct part, which opens out into the second coolant outlet opening, and a third duct part, which opens out into a third coolant outlet opening, wherein the first opening is arranged between the first and the second duct part, and wherein the second opening is arranged between the second and the third duct part.

13. Tool according to claim 1, wherein the cutting insert comprises a first fastening opening and the coolant guiding attachment comprises a second fastening opening, wherein, in the assembled state of the tool, the first fastening element is inserted into the holder through the first fastening opening, and the second fastening element is inserted into the holder through the second fastening opening.

14. Tool according to claim 1, wherein the first fastening element comprises a first screw and the second fastening element comprises a second screw, and wherein the holder comprises a first internal thread for screwing in the first screw and a second internal thread for screwing in the second screw.

* * * * *